INVENTOR.
IRVING I. SCHACHTEL

BY
Greene, Pineles & Durr
ATTORNEYS

March 17, 1959 I. I. SCHACHTEL 2,878,375

PORTABLE RADIO BROADCAST RECEIVER WITH REMOVABLE SPEAKER

Filed Feb. 21, 1955 2 Sheets-Sheet 2

INVENTOR.
IRVING I. SCHACHTEL

BY

Greene, Pineles & Durr

ATTORNEYS 2,878,375
Patented Mar. 17, 1959

2,878,375

PORTABLE RADIO BROADCAST RECEIVER WITH REMOVABLE SPEAKER

Irving I. Schachtel, New York, N. Y., assignor to Sonotone Corporation, Elmsford, N. Y., a corporation of New York Application February 21, 1955, Serial No. 489,424

2 Claims. (Cl. 250—16)

This invention relates to portable radio broadcast receivers enormous quantities of which are being sold and used. Because of the compact small size of such portable receivers, its speaker reproduces the broadcast radio program with a relatively small sound volume. In most cases more than one listener desires to hear, and the several listeners have to huddle closely to the speaker of the small broadcast receiver, this being a source of great annoyance to many users.

Among the objects of the invention is a portable radio broadcast receiver with a casing not greater than those used heretofore, but having—in addition to the radio receiver chassis, the associated antenna, speaker and energizing battery—a further speaker unit which is detachably held by the receiver casing and is readily removed therefrom, the detachable speaker unit being connected to the receiver chassis by a relatively long supply cord so that some listeners may comfortably hear the received programs at a distance from the receiver casing without having to remain huddled with other listeners next to the inbuilt conventional speaker of the receiver.

The foregoing and other objects of the invention will be best understood from the following description of specific exemplifications thereof, reference being had to the accompanying drawings wherein.

Figures 1, 2, 3, 4:
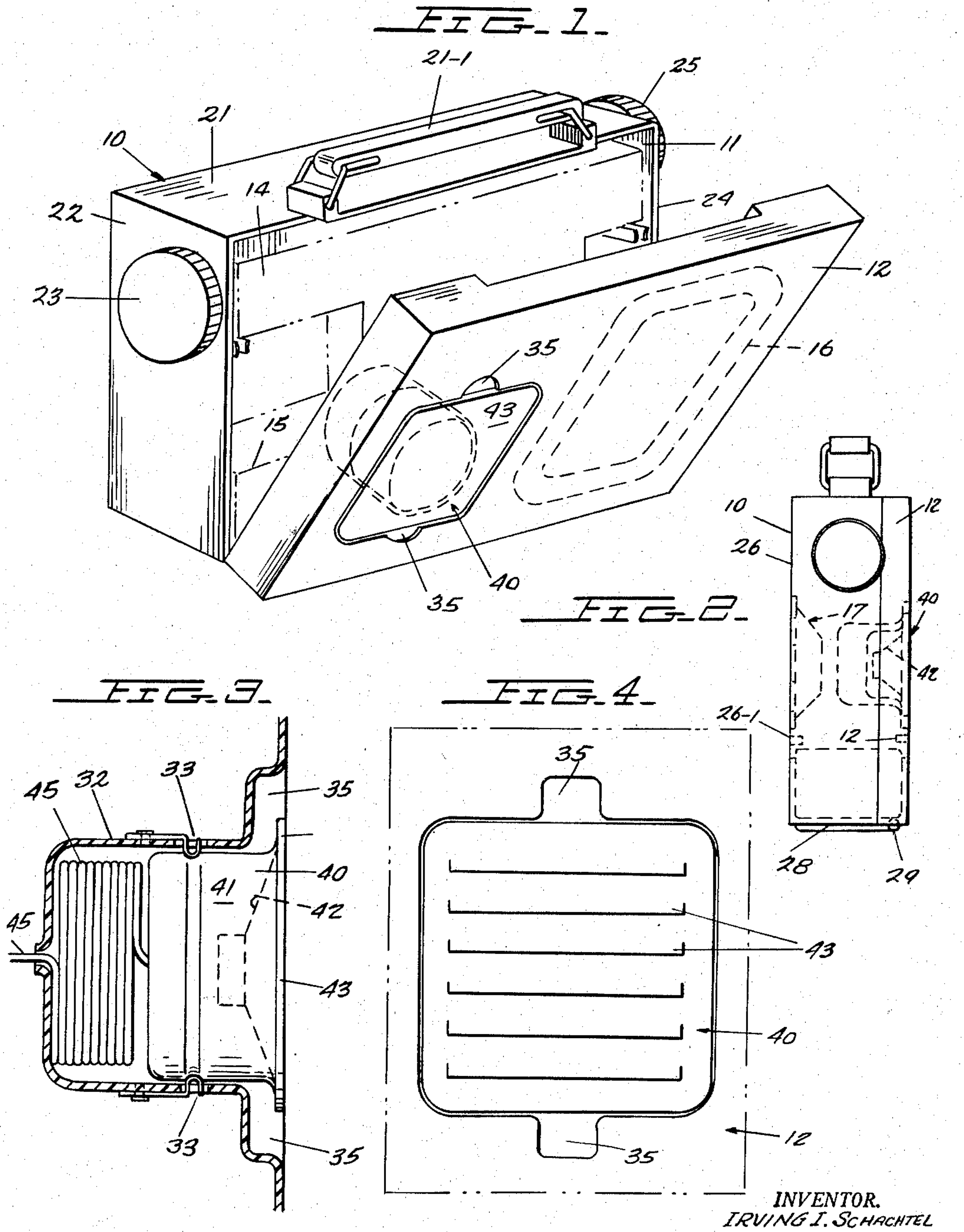
Fig. 1 is a perspective view of one form of a portable radio broadcast receiver exemplifying the invention.
Fig. 2 is an end view of the receiver of Fig. 1 as seen from the left side thereof.
Fig. 3 is an enlarged cross-sectional view of a rear wall portion of the receiver casing of Figs. 1, 2, with its detachable speaker unit of the invention.
Fig. 4 is an elevational view of the casing wall portion of Fig. 3.
Figure 5:
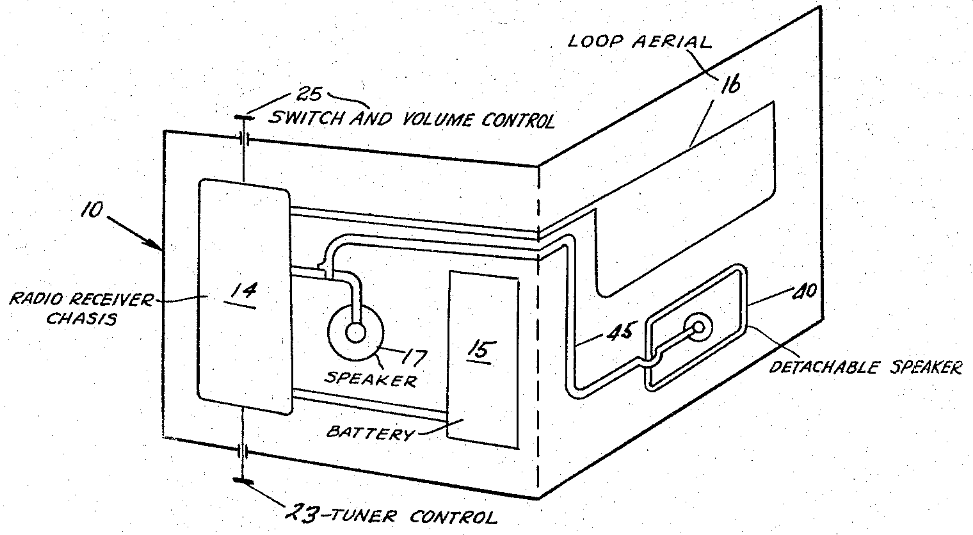
Fig. 5 is a diagrammatic explanatory view of the principal elements of the receiver of Figs. 1–4.

Any of the known different types of compact portable radio broadcast receivers may be readily modified in accordance with the principles of the invention explained hereinafter, so as to embody, in addition to its regular standard speaker unit mounted at one casing wall thereof, an additional or further speaker unit mounted detachably at another casing wall of the receiver and connection through relatively long supply leads or cord to the receiver chassis for acoustically transmitting the same broadcast program as the regular speaker of the receiver, so that by detaching the additional speaker unit and holding at a distance from the receiver casing, additional listeners are able to hear in comfort the same transmitted program without having to huddle next to the small speaker of the receiver casing.

Figs. 1–5 show by way of example how one of the many different well-known standard portable radio broadcast receivers may be modified to embody the additional speaker unit in accordance with the principles of the invention. The specific broadcast receiver shown is manufactured and sold by the Radio Corporation of America and is known as Model 3–BX–53, being designed for operation with a built-in electric battery. The receiver shown happens to be designed for being alternatively supplied from the domestic electric supply circuit with 110 volts A.C. or D.C. electric power.

The receiver of Figs. 1–5 comprises a generally rectangular flat casing 10 having a hingedly connected rear wall 12 enclosing in the interior of the casing space 11 the radio receiver chassis 14, the energy supply battery 15, the antenna 16 and the conventional speaker 17. The receiver chassis 14 is held affixed within the casing 10 directly below and adjacent the casing top wall 21. The receiver chassis 14 is of the conventional type and has a metal frame carrying all the components of the receiver circuit including the tubes or transistors in their proper operative position. The chassis 10 has a tuner shaft which projects through casing end wall 22 and carries a tuner knob 23 exposed on the exterior of the casing end wall 22 for adjusting the tuning of the chassis to a selected broadcast frequency. The chassis 14 has also a switch and volume control shaft extending through the opposite end wall 24 of the receiver casing 10 and having at its outer end a control knob 25 by means of which the energy supply from the battery to the receiver circuit is controlled in the conventional way by initial movement of the knob 25 from the "off" position, further turning of control knob 25 serving to adjust the volume of the speaker output of the receiver. The speaker 17 is held mounted within the casing 10 at its front wall 26 which has openings through which the conventional vibratory diaphragm of speaker 17 transmits acoustically the reproduced radio broadcast program toward the space adjoining the front casing wall 26. The speaker unit 17 which is mounted at the front casing wall 26 of the receiver is connected by leads to the audio-output side of the receiver circuit of chassis 14, in a conventional way. Similarly, the battery 15 is shown connected by conventional supply leads to the radio receiver circuit of the chassis 14. The hingedly connected casing rear wall 12 has cemented to its inner face the conventional radio antenna loop 16 which is connected by leads to the input side of the radio receiver circuit of the chassis 14.

The conventional battery 15 has the form of a rectangular battery pack and is positioned in the bottom part of the casing space 11 resting on the inner face of the bottom casing wall 28, wherein it is retained by inward retainer lugs 26–1 and 12–1 extending from the inner faces of the casing front wall 26 and the hinged rear casing wall 12. The rear wall 12 is hingedly connected to the rear edge of the bottom casing walls 28 by a conventional hinge connection 29. The top casing wall 21–1 serving to carry the receiver 10 in the hand of the 12–1 serving to carry the receiver 10 in the hand of the user.

The receiver elements described thus far constitute the well known standard equipment of a conventional portable radio broadcast receiver and they require no further description.

According to the invention a portable radio broadcast receiver of the type described above is provided with an additional speaker unit arranged for detachable mounting on one of the walls of the receiver casing and connected through relatively long supply leads or a cord to the output circuit leading to the built-in speaker unit 17 so as to enable ready removal of the additional speaker unit from the receiver casing 10 for listening to the broadcast program at a distance from the receiver casing 10, the additional speaker unit with its connector cord being readily returnable to their position in the receiver casing 10.

In the form of the invention shown in Figs. 1–5, the hingedly connected rear casing wall 12 carries thereon the additional detachable speaker unit 40. In the form shown, the detachable speaker unit 40 comprises a casing 41 which may be of rectangular or circular shape having mounted therein a conventional sound reproducing speaker mechanism 42 with vibratory diaphragm which transmits the reproduced sound program through an opening of the outer wall 43 of the speaker casing 41 to the space in front thereof. The rear casing wall 12 is formed with a reentrant compartment wall 32 shaped to receive and hold therein the detachable speaker unit 40. The sound reproducing means of the detachable speaker unit 40 is supplied with electric output through relatively long supply leads or cord 45, the inner ends of which are connected to the receiver output circuit in parallel to the leads 17–1 of the inbuilt speaker unit 17 of the receiver casing 10. The compartment space of speaker compartment 32 of the rear casing wall 12 is of sufficient depth so as to hold therein a substantial length of the connector cord 45 of the external speaker unit 40 when it is held within the speaker compartment 32 of the rear wall casing 12. In the form shown, the length of the connector cord 45 which is housed in the rear part of speaker compartment 12 is shown to be of the kind which is biased to assume a helical coiled shape so that when the speaker unit 40 is returned to its position within the casing wall 12, as seen in Figs. 1–4, the elongated connecting cord 45 will assume its retracted coiled shape in the rear part of the speaker compartment 32 and permit ready return of the speaker unit 40 to its position within the compartment wall 32.

The compartment wall 32 may be provided with retainer elements, such as one or more flexible detent springs 33 held by compartment wall 32 and biased to bring its nose end into yieldable engagement with a retainer recess in the speaker casing 41 for holding it in its position within the compartment 32 while permitting removal of the speaker 40 therefrom by exertion of a small pulling force against an edge of the speaker front wall 43. The rear casing wall 12 is shown provided with one or more recessed wall portions 35 along which is exposed an edge region of the speaker front wall 43, so that the speaker unit 40 may be gripped and removed from its compartment 32, against the restraint of the yieldable detent springs 33, to an outward position. When so removed, the seized speaker unit 40, with its long connecting cord 16 may be placed outside the compartment 32, so that some listeners may hear the broadcast program reproduced by the detached speaker unit 40 at a distance from the receiver casing 10, while other listeners hear it through the inbuilt speaker 17 of the receiver casing 10. The detached speaker unit 40 with its long cord 45 may be readily returned to its position in the casing compartment 32 by bringing the speaker unit 40 towards it and placing the retracted cord 45 and the speaker unit 40 in the interior of the casing compartment 32, wherein it is retained by the biased detent springs 33.

The receiver casing 10 may be made of any suitable material, such as wood, metal or according to the conventional practice, of molded hard and strong synthetic resin material.

Figure 6:
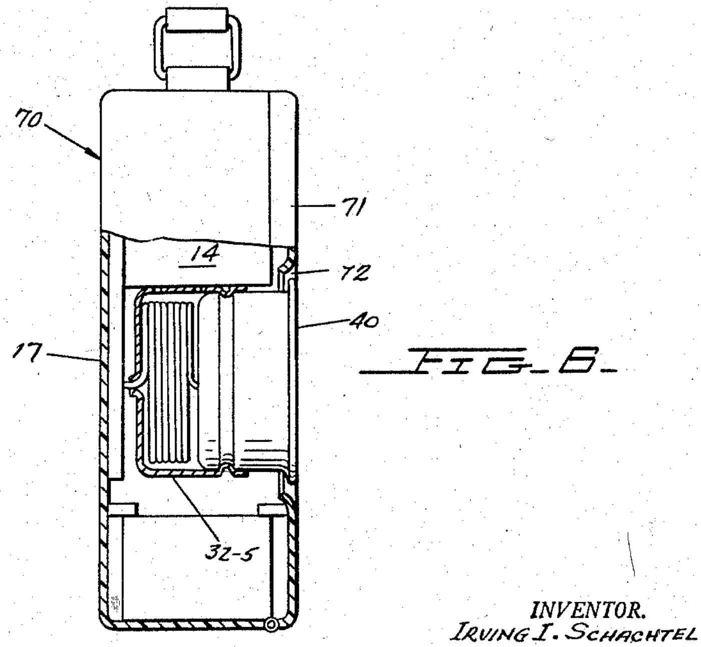
Fig. 6 is a view similar to Fig. 2 of a modified receiver, with a part in cross-section, of another exemplification of the invention.

The principles of the invention described above in connection with Figs. 1–5 will suggest many modifications thereof. Figure 6 shows by way of example, another portable radio receiver exemplifying the invention. It comprises a casing 70 similar to that of Figs. 1–5 having therein all the elements of a conventional portable radio broadcast receiver, such as described in connection with Figs. 1–5. In the receiver of Fig. 6, the rear wall 71 of the receiver casing 70 has an opening 72 through which a detachable speaker unit 40, identical with that of Figs.

1–5, is inserted into the interior of the receiver casing 70, so as to be retained at the rear wall 71 in the same way as in the receiver of Figs. 1–5. In the receiver of Fig. 6, the detachable speaker unit 40 is retained in a compartment wall 32–5 which does not form a part of the rear casing wall 70, but is attached, as by metal brackets, to the metallic chassis 14 of the receiver. Otherwise the receiver of the invention shown in Fig. 6 embodies all other features described above in connection with the receivers of Figs. 1–5.

The features and principles underlying the invention described above in connection with specific exemplifications will suggest to those skilled in the art many other modifications thereof. It is accordingly desired that the appended claims shall not be limited to any specific features or details shown and described in connection with the exemplifications thereof.

I claim:

1. In a radio broadcast receiver, a relatively compact casing small enough for carrying in the hand of the user, a radio receiver chassis including a radio receiver circuit within said casing and secured to a casing wall thereof, an antenna connected within said casing to said circuit, the interior of said casing having battery space for holding an electric battery connected to the receiving circuit of said chassis, a fixed sound-reproducing speaker held in the interior of said casing along one wall thereof and connected to said receiver circuits for transmitting outwardly from the region of said one wall a predetermined radio broadcast program supplied by said circuit, a further self-supporting sound-reproducing speaker unit, a further casing wall with a wall opening of sufficient area for said further speaker unit to pass through said wall opening, a support structure adjacent said wall opening for detachably supporting said further speaker unit within the casing for ready removal to and reinsertion from the outside through the opening, said further wall with said further speaker being arranged opposite said one wall, relatively long supply leads connecting said further speaker unit to said circuit for transmitting substantially the same broadcast program outwardly from the region of said further wall, said further speaker unit being removable from its inward position within said casing adjoining said further wall to an outward position at a substantial distance from said casing at which said further speaker unit will transmit said predetermined program to listeners who are unable to hear said predetermined program transmitted by said fixed speaker.

2. A radio broadcast receiver as claimed in claim 1, said support structure including a compartment wall held in the interior of said casing forming a compartment aligned with said wall opening and arranged to detachably and attachably hold in said compartment a length of said leads and at least a section of said further speaker unit when said further speaker unit is in its inward position.

References Cited in the file of this patent

UNITED STATES PATENTS

| | | |
|---|---|---|
| 1,521,650 | Rudolph | Jan. 6, 1925 |
| 1,932,343 | Holland | Oct. 24, 1933 |
| 1,954,392 | McNabb | Apr. 10, 1934 |
| 2,002,390 | Crosley et al. | May 21, 1935 |
| 2,159,632 | Morey | May 23, 1939 |
| 2,289,417 | Fisher | July 14, 1942 |
| 2,439,411 | Mitchell | Apr. 13, 1948 |
| 2,539,327 | Reid et al. | Jan. 23, 1951 |
| 2,731,555 | Beck | Jan. 17, 1956 |
| 2,777,902 | Goldmark | Jan. 15, 1957 |
| 2,828,360 | Gray | Mar. 25, 1958 |